(12) United States Patent
Zhang et al.

(10) Patent No.: US 8,724,258 B2
(45) Date of Patent: May 13, 2014

(54) SLANTED BUMP DESIGN FOR MAGNETIC SHIELDS IN PERPENDICULAR WRITE HEADS AND METHOD OF MAKING SAME

(75) Inventors: Sue S. Zhang, Saratoga, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 402 days.

(21) Appl. No.: 12/569,957

(22) Filed: Sep. 30, 2009

(65) Prior Publication Data

US 2011/0075295 A1    Mar. 31, 2011

(51) Int. Cl.
G11B 5/23    (2006.01)
(52) U.S. Cl.
USPC ............................ 360/119.04; 360/119.1
(58) Field of Classification Search
USPC ........... 360/119.04, 119.1, 119.11, 123.46, 360/123.47, 123.48, 123.55
See application file for complete search history.

(56) References Cited

U.S. PATENT DOCUMENTS

| | | | | |
|---|---|---|---|---|
| 3,795,954 | A | * | 3/1974 | Alex et al. .................. 29/603.11 |
| 4,646,184 | A | * | 2/1987 | Goto et al. ..................... 360/110 |
| 4,807,076 | A | | 2/1989 | Nakashima et al. |
| 4,861,398 | A | * | 8/1989 | Fukuoka et al. ................ 156/64 |
| 4,951,166 | A | | 8/1990 | Schewe |
| 4,987,514 | A | * | 1/1991 | Gailbreath et al. ........... 361/220 |
| 5,014,149 | A | * | 5/1991 | Ibaraki ..................... 360/125.63 |
| 5,075,956 | A | | 12/1991 | Das |
| 5,181,152 | A | * | 1/1993 | Yan et al. ................. 360/125.38 |
| 5,193,039 | A | * | 3/1993 | Smith et al. .................... 360/321 |
| 5,198,949 | A | * | 3/1993 | Narisawa et al. ........... 360/123.4 |
| 5,245,493 | A | | 9/1993 | Kawabe et al. |
| 5,333,086 | A | | 7/1994 | Frey et al. |
| 5,572,390 | A | * | 11/1996 | Saito et al. ............... 360/119.11 |
| 5,583,728 | A | * | 12/1996 | Imazeki et al. .......... 360/119.11 |
| 5,600,519 | A | | 2/1997 | Heim et al. |
| 5,949,624 | A | * | 9/1999 | Simmons et al. .......... 360/318.1 |
| 6,072,669 | A | * | 6/2000 | Indeck .......................... 360/121 |
| 6,337,783 | B1 | * | 1/2002 | Santini ......................... 360/317 |
| 6,430,806 | B1 | | 8/2002 | Chen et al. |
| 6,436,560 | B1 | * | 8/2002 | Kato et al. .................. 428/811.5 |
| 6,466,403 | B1 | * | 10/2002 | Sato et al. ................ 360/119.11 |
| 6,591,480 | B1 | * | 7/2003 | Chen et al. ................. 29/603.14 |
| 6,760,190 | B2 | * | 7/2004 | Kato et al. ................ 360/123.47 |
| 6,778,356 | B2 | * | 8/2004 | Kawai et al. ............... 360/125.5 |
| 6,791,793 | B1 | | 9/2004 | Chen et al. |
| 6,807,027 | B2 | | 10/2004 | McGeehin et al. |
| 6,906,894 | B2 | | 6/2005 | Chen et al. |
| 6,952,325 | B2 | | 10/2005 | Sato et al. |
| 6,954,332 | B1 | * | 10/2005 | Hong et al. ............. 360/125.56 |
| 7,002,778 | B2 | * | 2/2006 | Yazawa .................... 360/125.42 |

(Continued)

OTHER PUBLICATIONS

Z. J. Liu et al., Distribution of Slanted Write Field for Perpendicular Recording Heads with Shielded Pole, IEEE Transactions on Magnetics, vol. 41, No. 10, Oct. 2005, pp. 2908-2910.

(Continued)

*Primary Examiner* — Julie Anne Watko
(74) *Attorney, Agent, or Firm* — Patterson & Sheridan, LLP (57) ABSTRACT

Embodiments provide a slanted bump magnetic shield in a perpendicular write head. The slanted bump magnetic shield provides a small throat height to maximize magnetic flux for writing to a magnetic media such as a magnetic storage disk in a hard disk drive, while avoiding saturation.

22 Claims, 10 Drawing Sheets

(56) References Cited

U.S. PATENT DOCUMENTS

| | | |
|---|---|---|
| 7,042,682 B2 | 5/2006 | Hu et al. |
| 7,149,045 B1 | 12/2006 | Mallary et al. |
| 7,159,302 B2 | 1/2007 | Feldbaum et al. |
| 7,185,415 B2 | 3/2007 | Khera et al. |
| 7,212,379 B2 | 5/2007 | Hsu et al. |
| 7,219,414 B2 | 5/2007 | Watabe et al. |
| 7,245,454 B2 | 7/2007 | Aoki et al. |
| 7,248,437 B2 | 7/2007 | Yazawa et al. |
| 7,249,407 B2 | 7/2007 | Kobayashi |
| 7,305,753 B2 | 12/2007 | Kobayashi |
| 7,343,664 B2 | 3/2008 | Khera et al. |
| 7,365,942 B2 | 4/2008 | Sasaki et al. |
| 7,375,925 B2 | 5/2008 | Sasaki et al. |
| 7,377,024 B2 | 5/2008 | Chen |
| 7,394,621 B2 | 7/2008 | Li et al. |
| 7,643,246 B2 * | 1/2010 | Yazawa et al. ............ 360/125.2 |
| 2003/0193745 A1 * | 10/2003 | Sato ............................. 360/126 |
| 2004/0070874 A1 * | 4/2004 | Sato ............................. 360/126 |
| 2004/0090703 A1 * | 5/2004 | Morita et al. ................. 360/126 |
| 2004/0145828 A1 * | 7/2004 | Im ................................ 360/126 |
| 2004/0196589 A1 | 10/2004 | Lille |
| 2004/0212923 A1 | 10/2004 | Taguchi |
| 2005/0105213 A1 | 5/2005 | Takeo et al. |
| 2005/0259357 A1 | 11/2005 | Kameda |
| 2006/0028770 A1 | 2/2006 | Etoh et al. |
| 2006/0098339 A1 | 5/2006 | Koyama et al. |
| 2006/0215314 A1 | 9/2006 | Chen |
| 2006/0291096 A1 | 12/2006 | Sasaki et al. |
| 2007/0064343 A1 | 3/2007 | Yazawa et al. |
| 2007/0067982 A1 | 3/2007 | Kobayashi |
| 2007/0121248 A1 | 5/2007 | Sasaki et al. |
| 2007/0268626 A1 | 11/2007 | Taguchi et al. |
| 2007/0285835 A1 | 12/2007 | Sun et al. |
| 2008/0117546 A1 | 5/2008 | Le et al. |
| 2008/0232001 A1 | 9/2008 | Bonhote et al. |

OTHER PUBLICATIONS

Christian R. Bonhôte et al., U.S. Appl. No. 12/569,973, entitled Trailing Plated Step, filed Sep. 30, 2009.

Trevor W. Olson et al., U.S. Appl. No. 12/569,962, entitled Magnetic Write Heads for Hard Disk Drives and Method of Forming Same, filed Sep. 30, 2009.

Office Action dated Nov. 30, 2011 for U.S. Appl. No. 12/569,962.

Final Office Action for U.S. Appl. No. 12/569,962 dated Mar. 6, 2012.

Advisory Action for U.S. Appl. No. 12/569,962 dated May 10, 2012.

* cited by examiner

SLANTED BUMP DESIGN FOR MAGNETIC SHIELDS IN PERPENDICULAR WRITE HEADS AND METHOD OF MAKING SAME

BACKGROUND OF THE INVENTION

1. Field of the Invention

Embodiments of the present invention generally relate to write heads for hard disk drives and in particular to a slanted bump design for magnetic shields of write heads used for perpendicular recording on a magnetic disk.

2. Description of the Related Art

There has been increasing progress in the field of magnetic disk storage system technology in recent years. Such success has made storage systems an important component of modern computers. Some of the most important customer attributes of any storage system are the cost per megabyte, data rate, and access time. In order to obtain the relatively low cost of magnetic disk storage systems compared to solid state memory, the customer must accept the less desirable features of this technology, which include a relatively slow response, high power consumption, noise, and the poorer reliability attributes associated with any mechanical system. On the other hand, magnetic storage systems have always been non-volatile; i.e., no power is required to preserve the data, an attribute which in semiconductor devices often requires compromises in processing complexity, power-supply requirements, writing data rate, or cost. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one alternative to increase areal densities when compared with longitudinal recording. In recent years, the increased demand for higher data rate and areal density has driven the perpendicular head design to scale toward smaller dimensions and the need for constant exploration of new head designs, materials, and practical fabrication methods. Some of the problems encountered with perpendicular recording are side writing and side erasure, to adjacent tracks on the disk. These problems occur from leakage and fringing of the magnetic flux from the magnetic write head. To minimize these effects, one approach is to provide either a trailing or wrap-around shield on the magnetic write head. These shields allow effective magnetic flux to be provided for writing to the disk, while avoiding leakage and fringing that can lead to the above-described problems. As the areal density of the disks increases, however, the ability of existing shields to achieve the desired results decreases.

SUMMARY OF THE INVENTION

The present invention, in a first embodiment, is a magnetic write head for a hard disk drive. The magnetic write head includes: an air bearing surface (ABS); a magnetic write pole having an end that defines part of the ABS; a layer of non-magnetic gap material on the magnetic write pole, the layer of non-magnetic gap material including a taper defined by an increasing thickness of the layer of non-magnetic gap material from a first thickness at a first distance from the ABS, to greater thicknesses in a direction away from the ABS; and a magnetic shield on the layer of non-magnetic gap material.

In a further embodiment, the invention is a hard disk drive having a magnetic storage disk and a magnetic write head for writing data to the disc drive. The magnetic write head includes an air bearing surface (ABS), adjacent to and facing the magnetic disk, a magnetic write pole having an end substantially on the ABS, a layer of non-magnetic gap material on the magnetic write pole, the layer of non-magnetic gap material including a taper defined by an increasing thickness of the layer of non-magnetic gap material from a first thickness at a first distance from the ABS, to greater thicknesses in a direction away from the ABS; and a magnetic shield on the layer of non-magnetic gap material.

In another embodiment the invention is a method of forming a magnetic write head. The method includes providing a substrate, wherein the substrate has a first layer of magnetic material for forming a magnetic pole of the write head, and a second layer of non-magnetic material on the first layer. A third layer of non-magnetic gap material is then deposited on the second layer, followed by depositing a layer of photoresist on the third layer. A first etch process is conducted on the third layer using the layer of photoresist as a mask. A second etch process is conducted on the third layer and the first and second etch processes form a taper in the third layer, such that the layer of non-magnetic gap material increases in thickness at a first distance from the ABS, in a direction away from the ABS. A fourth layer of magnetic material is deposited on the third layer to form a magnetic shield of the write head.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the present invention are related to reducing magnetic flux leakage and fringing and the problems caused thereby, in magnetic write heads for hard disk drives. While embodiments of the invention are particularly suitable for use in magnetic disk hard drives, this use should not be considered limiting as the magnetic write head of the invention could be used to write to any type of magnetic media where magnetic leakage and fringing is an issue. The advent of perpendicular magnetic recording, (PMR), while providing significantly higher storage density than longitudinal recording, has introduced its own set of challenges. One of these challenges is the need to suppress stray fields from the perpendicular write pole, due to the high writing current required in perpendicular recording. One method of suppressing stray magnetic fields, is through the use of magnetic shields at the trailing end of the read/write head. The shield is separated from the write pole by a shield gap formed of non-magnetic material. The shield gap has a portion of reduced thickness adjacent the ABS and forms a shield gap throat. In the region of the shield gap throat the distance between the magnetic shield and the write pole is reduced. The height of the shield gap throat, from the ABS to the point where the gap starts to increase in thickness is known as the throat height. For high area density PMR, the shield throat height must be relatively small. However, the small throat height tends to cause saturation. Embodiments of the present invention provide a slanted bump magnetic shield. The slanted bump is formed by a taper in the gap material and provides a relatively small throat height, while avoiding saturation.

Two common types of magnetic shields for perpendicular write head poles are the trailing shield and the wrap-around shield. A trailing shield is predominantly located on the trailing end of the read/write head, while wrap-around shields provide additional shielding by wrapping around the write pole and covering the sides of the write pole as well as the trailing end. The wrap-around shield is the most efficient type of shield for stray field suppression. Both types of shields benefit from the slanted bump of the invention.

Figure 1:
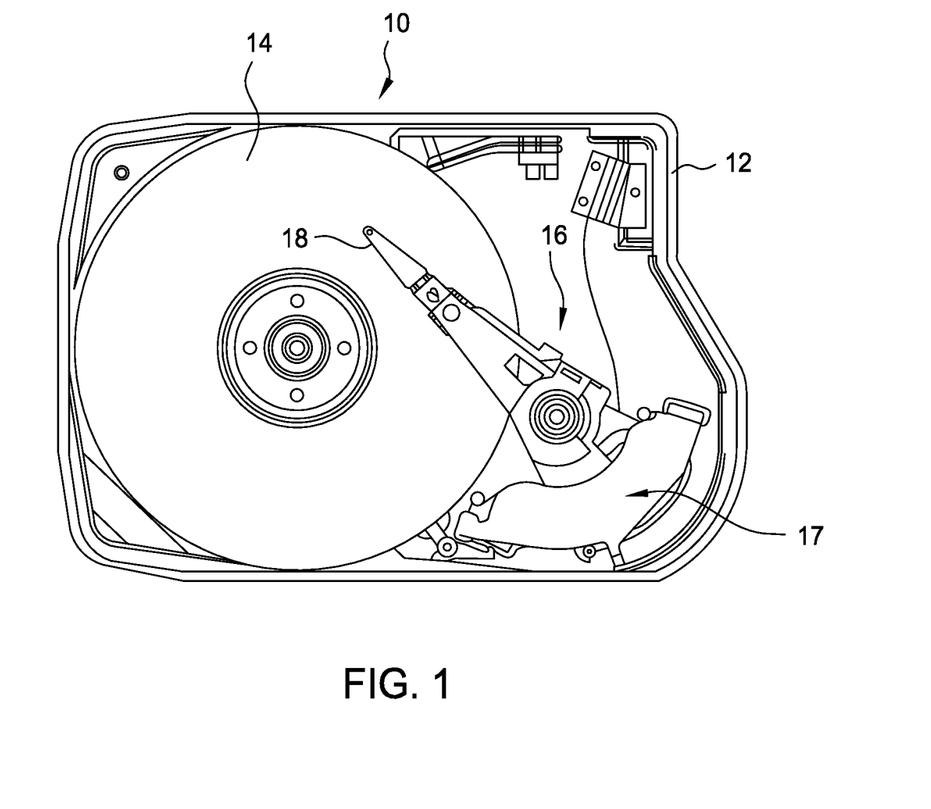
FIG. 1 shows an exemplary disk drive having a magnetic disk, and magnetic read/write head mounted on an actuator, according to one embodiment of the invention.

FIG. 1 shows one embodiment of a magnetic hard disk drive 10 that includes a housing 12 within which a magnetic disk 14 is fixed to a spindle motor (SPM) by a clamp. The SPM drives the magnetic disk 14 to spin at a certain speed. A head slider 18 accesses a recording area of the magnetic disk 14. The head slider 18 has a head element section and a slider to which the head element section is fixed. The head slider 18 is provided with a fly-height control which adjusts the flying height of the head above the magnetic disk 14. An actuator 16 carries the head slider 18. In FIG. 1, the actuator 16 is pivotally held by a pivot shaft, and is pivoted around the pivot shaft by the drive force of a voice coil motor (VCM) 17 as a drive mechanism. The actuator 16 is pivoted in a radial direction of the magnetic disk 14 to move the head slider 18 to a desired position. Due to the viscosity of air between the spinning magnetic disk 14 and the head slider's air bearing surface (ABS) facing the magnetic disk 14, a pressure acts on the head slider 18. The head slider 18 flies low above the magnetic disk 14 as a result of this pressure balancing between the air and the force applied by the actuator 16 toward the magnetic disk 14.

Figure 2A:
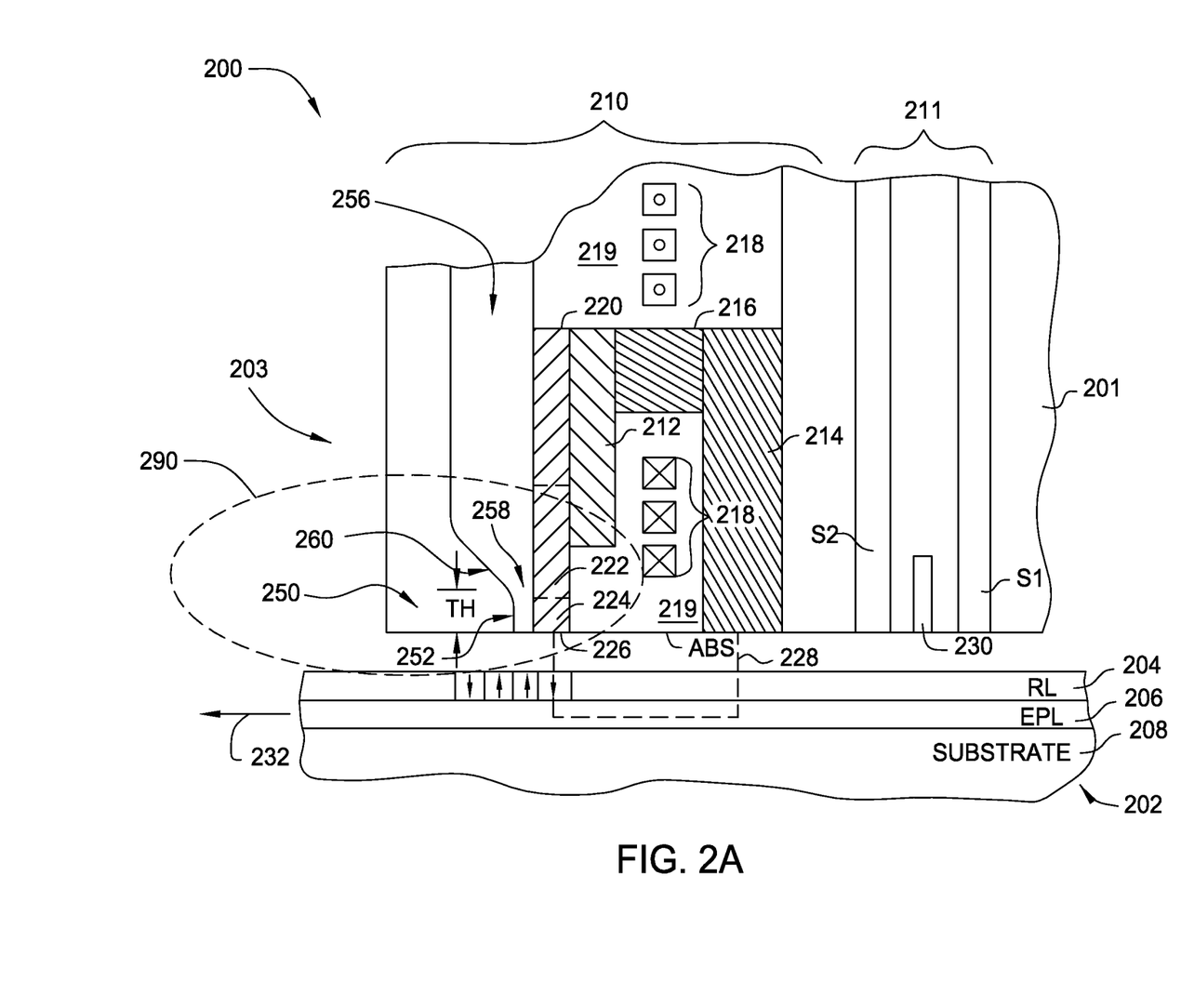
FIG. 2A is a side view of the read/write head and magnetic disk of the disk drive of FIG. 1, according to one embodiment of the invention.

FIG. 2A is a fragmented, cross-sectional side view through the center of an embodiment of a read/write head 200 mounted on a slider 201 and facing magnetic disk 202. In one embodiment, the slider 201 is the head slider 18 of FIG. 1 and magnetic disk 202 is the magnetic disk 14 of FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EBL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by arrow 232, so the portion of slider 201 that supports the read head 211 and write head 210 is often called the slider "trailing" end 203. The read/write head 200 is typically formed on the trailing end 203 of the air-bearing slider 201 that has its ABS (not shown) supported above the surface of disk 202.

In some embodiments, the magnetic read head 211 is a magnetoresistive (MR) read head that includes an MR sensing element 230 located between MR shields S1 and S2. The RL 204 is illustrated with perpendicularly recorded or magnetized regions, with adjacent regions having opposite magnetization directions, as represented by the arrows located in the RL 204. The magnetic transitions between adjacent oppositely-directed magnetized regions are detectable by the MR sensing element 230 as the recorded bits.

The write head 210 includes a yoke made up of a main pole 212, a flux return pole 214, and a yoke 216 connecting the main pole 212 and the flux return pole 214. Write head 210 also includes a thin film coil 218 shown in section embedded in non-magnetic material 219 and wrapped around yoke 216. A write pole 220 is magnetically connected to the main pole 212 and has an end 226 that defines part of the ABS of the magnetic write head 210 facing the outer surface of disk 202. In some embodiments, write pole 220 is a flared write pole and includes a flared portion 222 and a pole tip 224 that includes end 226 on the ABS. In flared write pole embodiments, the thickness of the write pole 220 (into and out of the page in FIG. 2A), increases from a first thickness at the pole tip 224 to greater thicknesses in the flared portion 222. Flared portion 222 may extend the entire height of write pole 220 (up and down in FIG. 2A), or may only extend for a portion of the height, as shown in FIG. 2A. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to the return pole 214.

Figure 4A:
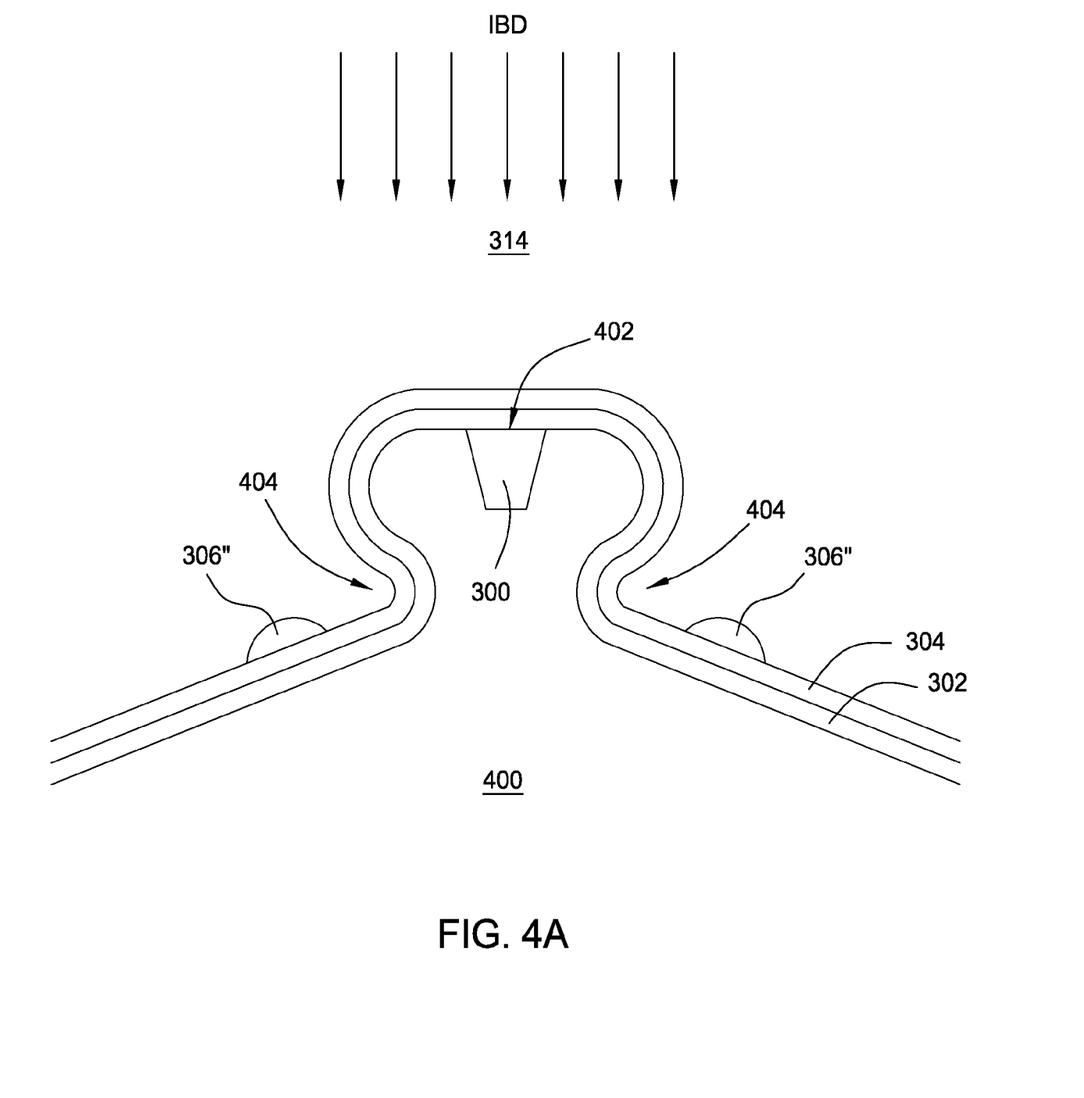
FIG. 4A shows one embodiment of a cross section of the structure of FIG. 3I taken through section line 4-4.
Figure 4B:
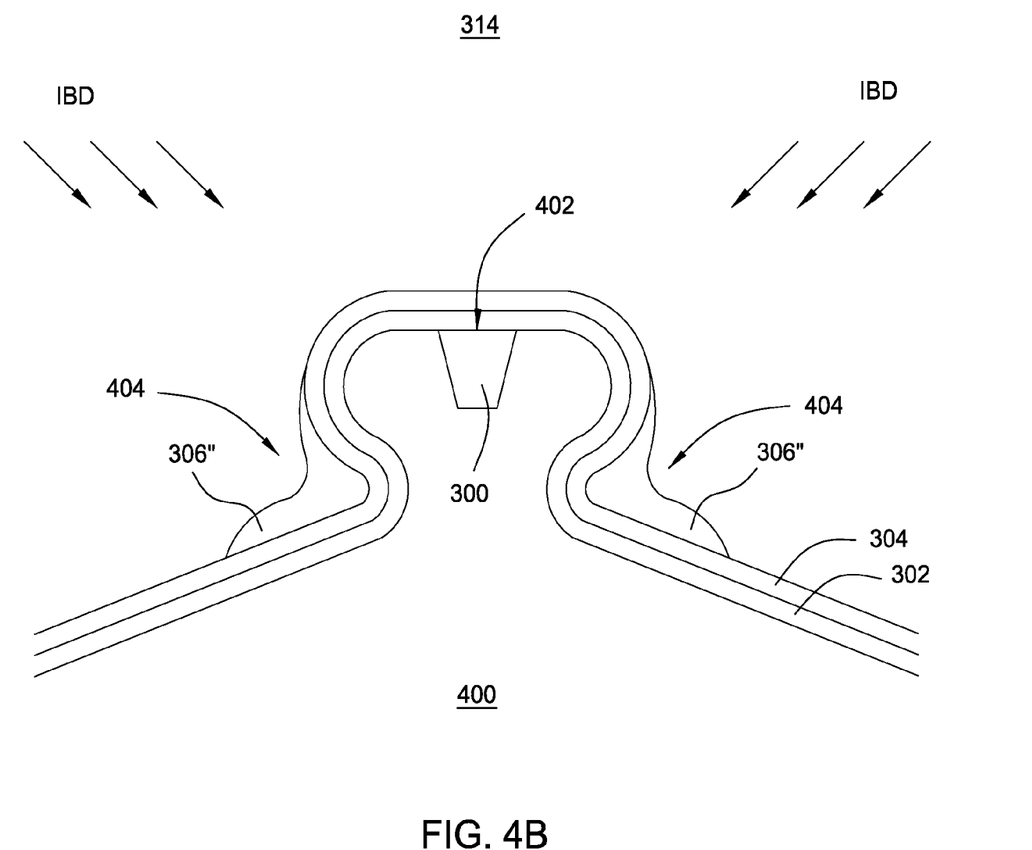
FIG. 4B shows a further embodiment of a cross section of the structure of FIG. 3I taken through section line 4-4.
Figure 5A:
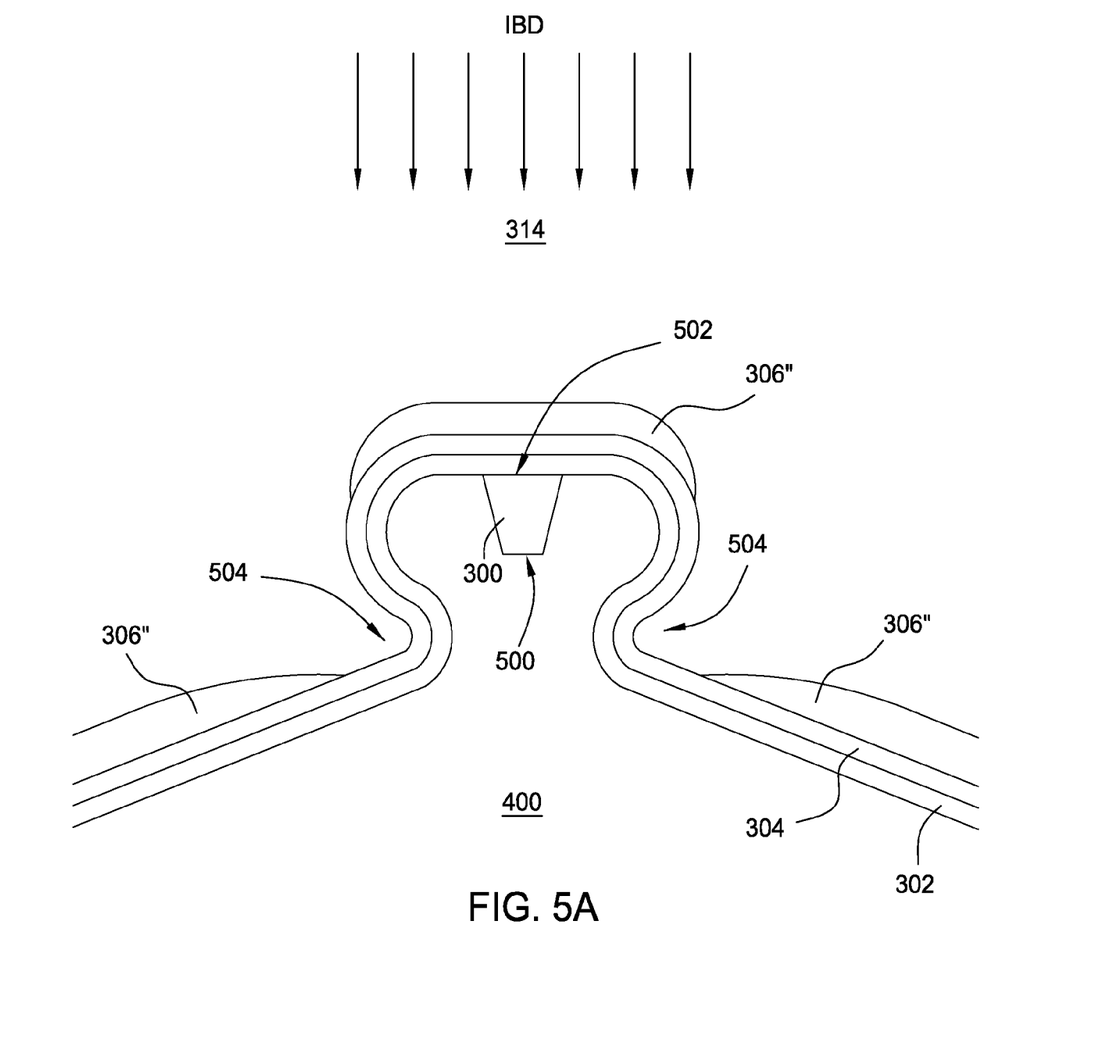
FIG. 5A shows one embodiment of a cross section of the structure of FIG. 3I taken through section line 5-5.
Figure 5B:
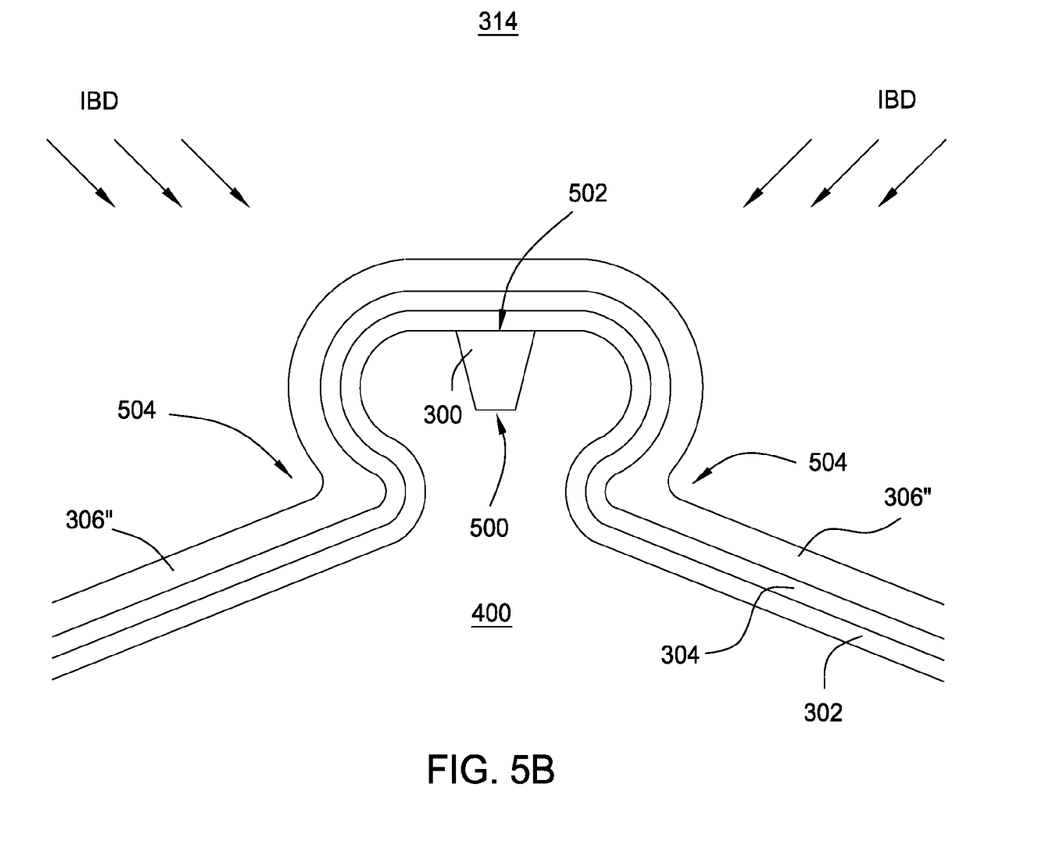
FIG. 5B shows a further embodiment of a cross section of the structure of FIG. 3I taken through section line 5-5.

FIG. 2A also illustrates one embodiment of a magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220, as best shown in FIGS. 4 and 5. As FIG. 2A is a cross section through the center of the read/write head 200, it represents both trailing and wrap-around embodiments.

Figure 2B:
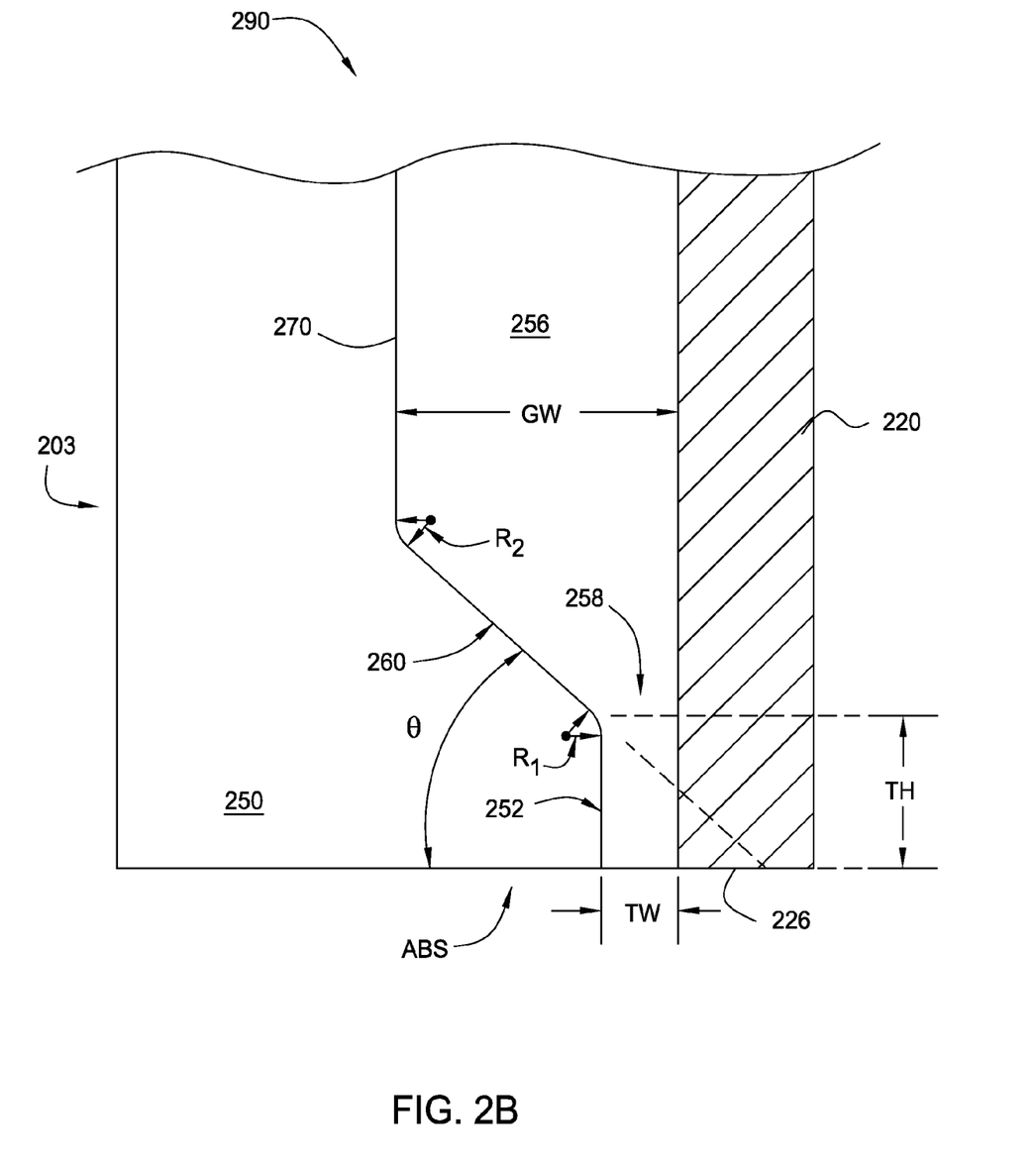
FIG. 2B is an enlarged side view of a portion of the read/write head of FIG. 2A, according to one embodiment of the invention.
Figure 2C:
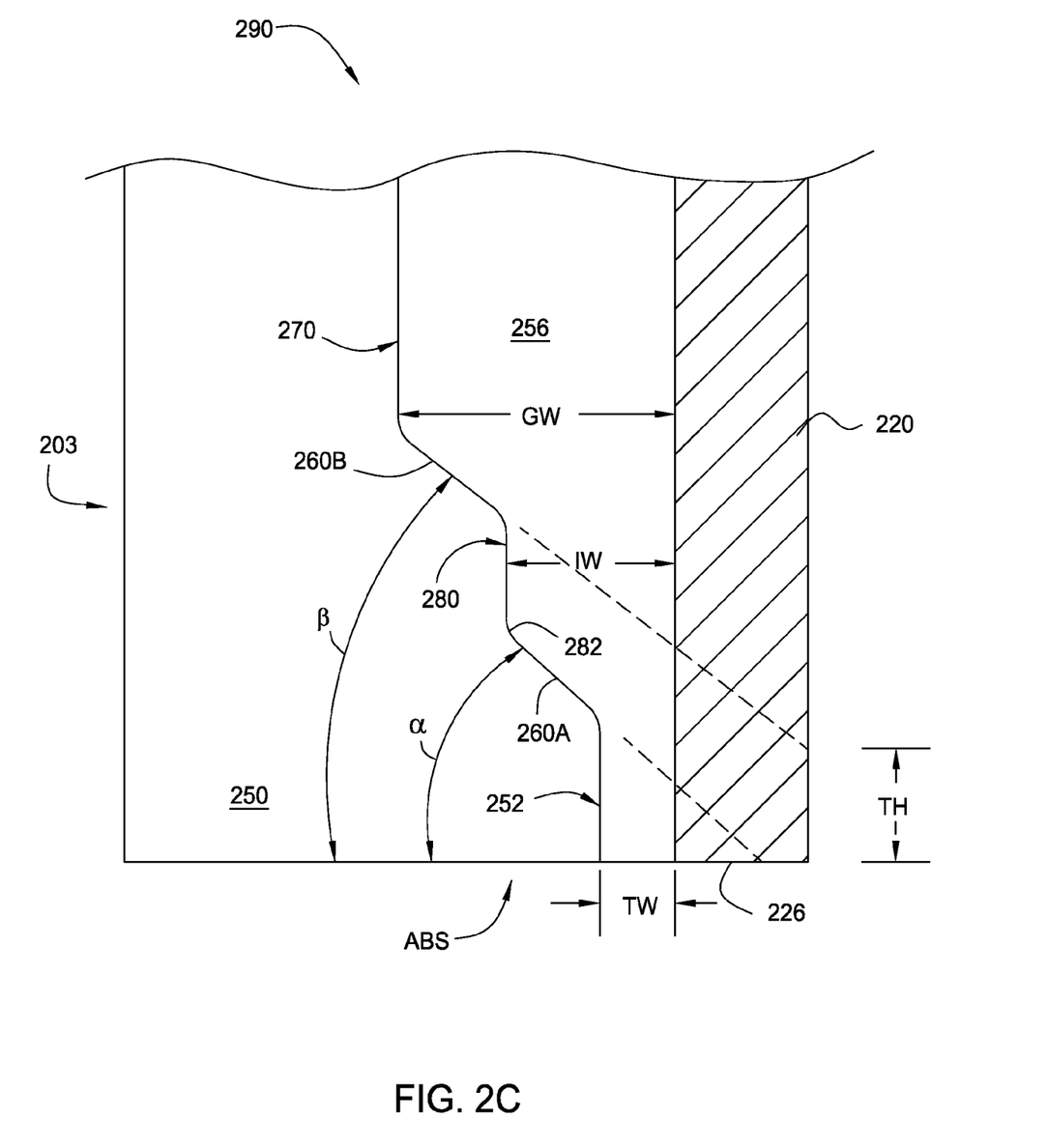
FIG. 2C is an enlarged side view of a portion of the read/write head of FIG. 2A, according to a further embodiment of the invention.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, SiC or $Al_2O_3$). A taper 260 in the gap material provides a gradual transition from the gap width at the ABS to a maximum gap width above the taper 260. This gradual transition in width, forms a slanted bump in the magnetic shield 250 that allows for greater magnetic flux density from the write pole 220, while avoiding saturation. It should be understood that the taper 260 may extend either more or less than is shown in FIGS. 2A-2C. The taper may extend upwards to the other end of shield 250 (not shown), such that the maximum gap width is at the end of the shield opposite the ABS. The gap layer thickness increases from a first thickness (the throat gap width) at a first distance from the ABS (the throat gap height) to greater thicknesses in a direction away from the ABS, to a greatest thickness at a second distance (greater than the first distance) from the ABS.

FIG. 2B shows an enlarged side view of section 290 of FIG. 2A. Taper 260 forms angle θ relative to the ABS of the read/write head 200. In one embodiment θ is between about 10° and about 70° to the ABS of the read/write head 200, and forms a substantially fixed slope. The throat gap width is labeled as TW in FIG. 2B and is defined as the distance between the WP 220 and the magnetic shield 250 at the ABS. The taper in the gap layer 256, allows for a reduced TW without excessive fringing of the magnetic field. In one embodiment, the TW is between about 15 nm and 40 nm. The throat height TH is generally defined as the distance between the ABS and the shield height at the front edge 252 of the shield 250. In some embodiments, the TH is between about 20 nm and 150 nm. Above the TH, the width of the gap 256 increases to a maximum gap width GW along taper 260. Taper 260 extends for between 40 nm and 300 nm above the TH, depending on the TW, GW and θ. The maximum gap width GW is between 40 nm and 300 nm. The transition between the front edge 252 and taper 260 as well as the transition between the taper 260 and the relatively straight portion 270 of the shield 250, may be abrupt and form sharp corners, or may be more gradual.

FIG. 2C shows an enlarged side view of section 290 of FIG. 2A, according to another embodiment of the invention in which the taper is discontinuous. In the illustrative embodiment, taper 260 is split into two portions 260A and 260B, such that an intermediate gap is formed at section 280, between the two tapers 260A and 260B. The intermediate gap has an intermediate width IW. IW is between TW and GW and in one embodiment may be the average of TW and GW such that IW=(TW+GW)/2, although other IW values are also possible. Section 280 forms corners 282 with tapers 260A and 260B. Corners 282 may be sharp corners or may be rounded, and the respective radius of curvatures $R_N$ may be the same or different. Taper 260A forms angle α with the ABS of the read/write head 200, while taper 260B forms angle β with the ABS of the read/write head 200. In one embodiment α and β are between about 10° and about 70° to the ABS. While in some embodiments, α and β are equal, in other embodiments, they may be unequal. For example, in one embodiment, taper 260A may form a relatively small angle with front edge 252 (which forms an angle of about 90° with the ABS, in one embodiment) such that α is about 60°, while taper 260B may be steeper with respect to front edge 252 such that β is about 30°. It should also be noted that while only one intermediate section 280, and two tapers 260A and 260B are shown in FIG. 2C, any number of tapers and intermediate sections may be included without departing from the scope of the invention.

Figure 3A:
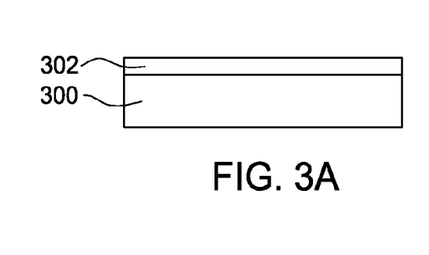
FIGS. 3A-3I are side views showing various stages of producing a tapered magnetic shield, according to one embodiment of the invention.
Figure 3B:
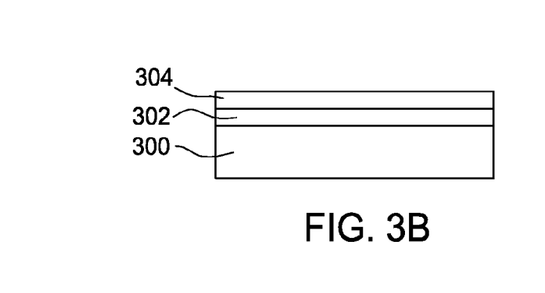
Figure 3C:
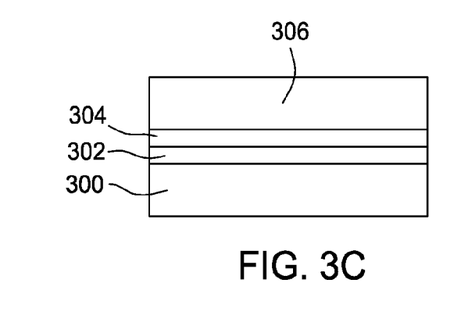
Figure 3D:
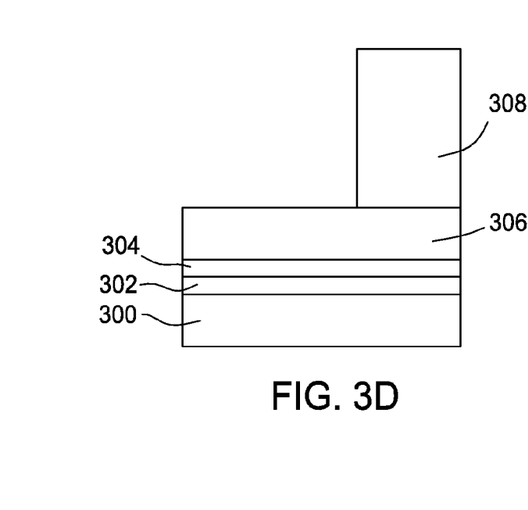
Figure 3E:
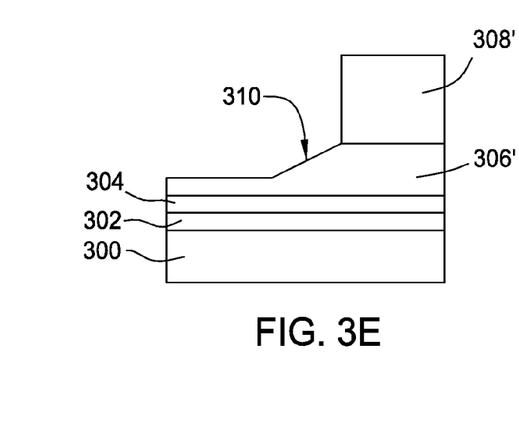

FIGS. 3A-3I illustrate one embodiment of a method for forming the slanted bump magnetic shield of the invention. In FIG. 3A a substrate 300 is shown. Substrate 300 may be WP 220 of FIGS. 2A-2C, or may be a temporary substrate from which the deposited layers are transferred to WP 220. In some embodiments, the substrate 300 may be a laminated main pole and may include a remaining alumina mask layer 302 situated thereon. A relatively thin (e.g., between about 2 nm and 50 nm thick) ruthenium seed layer 304 is then deposited on top of layer 302 as is shown in FIG. 3B. Other suitable materials for seed layer 304 include rhodium and iridium, for example. FIG. 3C shows a layer of non-magnetic gap material (which in one embodiment can be Ta, TaO or $Al_2O_3$) 306 deposited on top of the ruthenium seed layer 304. Layer 306 is deposited by physical vapor deposition (PVD) or ion beam deposition (IBD), in one embodiment, to a thickness of between about 30 nm and 200 nm. Continuing to FIG. 3D, a bi-layer photoresist 308 is deposited and patterned on top of layer 306. After the photoresist 308 is patterned, the structure is subjected to a reactive ion etch (RIE) that removes part of the photoresist layer to leave layer 308' as shown in FIG. 3E. The RIE, in one embodiment, is conducted using $CF_4$ and Ar, and removes portions of layer 306 not protected by photoresist layer 308, to form layer 306'. A taper 310 is formed by the RIE in the portion of layer 306' not protected by the photoresist. In one embodiment, layer 306 is formed of $Al_2O_3$, and is etched using an inductively coupled plasma (ICP) tool. In one embodiment, the taper angle (for example θ in FIG. 2B) can be "tuned" to be between about 30° and about 60° by varying the process parameters as shown in Table 1, below, within the specified range.

TABLE 1

| | |
|---|---|
| Chamber pressure range | 1 to 10 mTorr |
| ICP power range | 200 to 800 W |
| RF power range | 200 to 500 W |
| Gas flow range ($CHF_3$) | 15 to 50 sccm |
| Gas flow range ($CF_4$) | 15 to 50 sccm |
| Gas flow range (Ar) | 10 to 30 sccm |

Figure 3F:
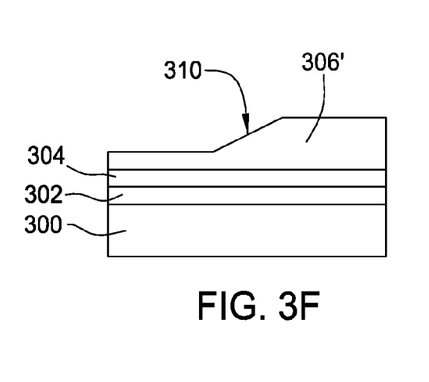
Figure 3G:
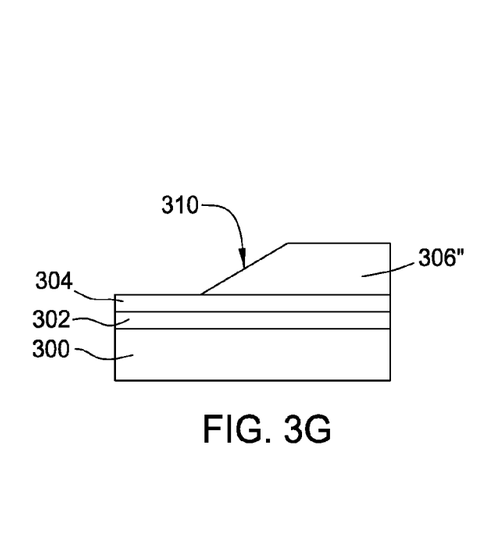
Figure 3H:
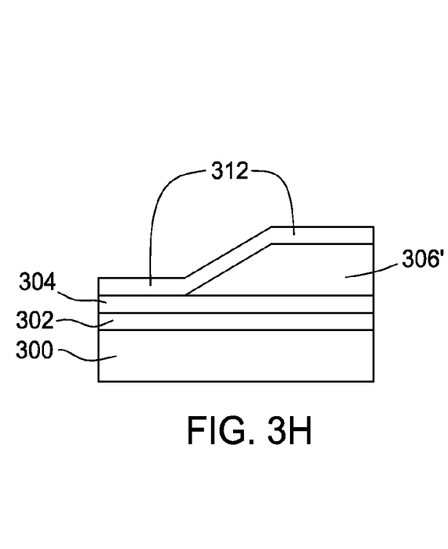
Figure 3I:
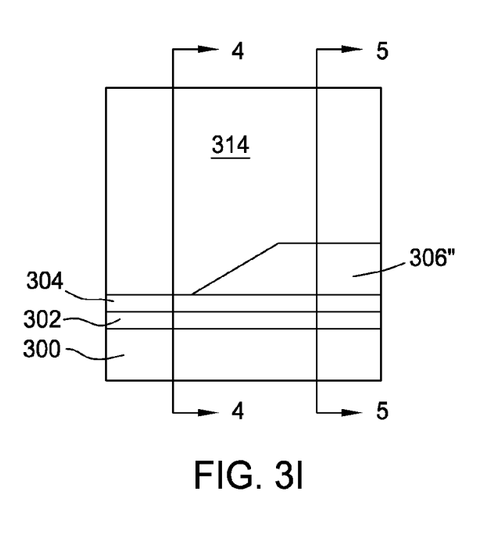

In FIG. 3F, the remaining photoresist 308' has been removed using a photoresist lift-off process. A second RIE using low RF power is then used to remove a portion of layer 306' to form layer 306" as shown in FIG. 3G, such that a portion of layer 304 is exposed. The second, low power, RIE may be conducted just after the first, high power, RIE and prior to the photoresist lift-off process, in some embodiments of the invention. In one embodiment, the first RIE removes from about 70% to about 90% or about 80% of the total material of layer 306 that is to be removed, while the second RIE removes the remaining about 30% to about 10% or about 20%. The percentage of material removed by each RIE operation may be varied, although it is believed that by ending the RIE process using a relatively lower power RIE, better edge and thickness control can be achieved. By performing the RIE processes sequentially, a single RIE can be performed and the power reduced during the operation, thereby possibly reducing time and cost of the assembly process. In one embodiment, layers 302, 304 and 306" form the non-magnetic gap layer 256 of FIGS. 2A-2C. After the taper 310' is formed in layer 306", a seed layer 312 is deposited on layers 304 and 306", as shown in FIG. 3H. Seed layer 312 is formed of, but is not limited to NiFe, CoFe, CoNiFe and CoFeCr. Magnetic material (such as Ni, Co and Fe alloys) to form the magnetic shield layer 314 is then deposited on seed layer 312, to complete the structure as shown in FIG. 3I. In some embodiments, magnetic shield layer 314 forms the magnetic shield 250 of FIGS. 2A-2C.

FIG. 4A is a cross section of one embodiment of the structure of FIG. 3I taken through section line 4-4, (approximately at the level of the ABS, as shown in FIG. 2A). In this embodiment, a relatively vertical IBD process (normal to top surface 402 of main pole 300) is used to deposit layer 306 (FIG. 3C) as shown by the arrows at the top of FIG. 4A. In FIG. 4A, the ABS end of the main pole (layer 300) is shown. As can be seen in FIG. 4A, in one embodiment, the main pole 300 is trapezoidal in cross-section. Other cross sectional shapes are contemplated and the specific shape should not be considered limiting in terms of the invention. The main pole 300 is surrounded by non-magnetic material 400. Material 400 includes material 219 (FIG. 2B) below and on the sides of the main pole 300. Layers 302 and 304 (FIG. 3I) form a thin layer on top of the main pole 300 and on the top and sides of material 400. Shield 314 surrounds the main pole structure and is separated from the main pole 300 by a relatively thinner gap formed by layers 302 and 304. Note that, in this embodiment, layer 306" is only present in the "shoulder" area 404 as the top portion of the layer 306 does not extend to the ABS as shown by section line 4-4 in FIG. 3I. A relatively small amount of 306" is deposited as the top portions of layers 302 and 304 "shade" the deposition of layer 306.

FIG. 4B is a cross section of a further embodiment of the structure of FIG. 3I taken through section line 4-4, (approximately at the level of the ABS, as shown in FIG. 2A). In this embodiment, an IBD process at approximately 45° to top surface 402 of main pole 300 is used to deposit layer 306 (FIG. 3C), as shown by the arrows at the sides of FIG. 4B. In FIG. 4B, the ABS end of the main pole (layer 300) is shown. The main pole 300 is surrounded by non-magnetic material 400. Material 400 includes material 219 (FIG. 2B) below and on the sides of the main pole 300. Layers 302 and 304 (FIG. 3I) form a thin layer on top of the main pole 300 and on the top and sides of material 400. Shield 314 surrounds the main pole structure and is separated from the main pole 300 by a relatively thinner gap formed by layers 302 and 304. Note that, in this embodiment, layer 306" is only present in the "shoulder" area 404 as the top portion of this layer does not extend to the ABS as shown by section line 4-4 in FIG. 3I. A relatively larger amount of 306" is deposited to the sides of the magnetic main pole 300 as the top portions of layers 302 and 304 do not shade the deposition of layer 306, as the IBD deposition process is performed at an angle.

FIG. 5A is a cross section of one embodiment of the structure of FIG. 3I taken through line 5-5. In FIG. 5A the top of the main pole 300 is separated from the shield 314 by a relatively thicker gap formed of layers 302, 304 and 306" of FIG. 3I. In FIG. 5A, the gap material 306 is deposited using either PVD, or alternatively, may be deposited using a vertical IBD process (normal to top surface 502 of main pole 300), as shown by the arrows at the top of the figure. In this embodiment, as also described with respect to FIG. 4A, a relatively small amount of the layer 306" is deposited as the top portions of layers 302 and 304 "shade" the deposition of layer 306.

FIG. 5B is a cross section of a further embodiment of the structure of FIG. 3I taken through line 5-5. In this embodiment, an IBD process at approximately 45° to top surface 502 of main pole 300 is used to deposit layer 306 (FIG. 3C), as shown by the arrows at the sides of FIG. 5B, and as described with respect to FIG. 4B. In FIG. 5A the top of the main pole 300 is separated from the shield 314 by a relatively thicker gap formed of layers 302, 304 and 306" of FIG. 3I. By using an angled IBD process, gap material may be formed thicker in regions 504 below the bottom 506 of the main pole 300. Those portions of layers 302, 304 and 306", to the side of the main pole 300, form a side gap of the magnetic shield. Additional material in regions 504 provides better control of the side gap of the magnetic shield 314, by reducing side writing and erasure.

While the foregoing is directed to embodiments of the present invention, other and further embodiments of the invention may be devised without departing from the basic scope thereof, and the scope thereof is determined by the claims that follow.

What is claimed is:

1. A magnetic write head for a hard disk drive, comprising:
   an air bearing surface (ABS);
   a magnetic write pole having an end that defines part of the ABS;
   a first non-magnetic layer disposed on the magnetic write pole and having an end at the ABS;
   a seed layer disposed on the first non-magnetic layer, wherein the first non-magnetic layer and the seed layer have a combined first thickness;
   a second non-magnetic layer disposed on the seed layer, wherein the second non-magnetic layer is recessed from the ABS and has a taper defined by an increasing thickness of the second non-magnetic layer from a second thickness at a first distance from the ABS, to a third thickness at a second distance from the ABS, where the third thickness is greater than the first thickness and the second distance is greater than the first distance; and
   a magnetic shield disposed on the seed layer and the second non-magnetic layer.

2. The magnetic write head of claim 1, wherein the first distance is between 20 nm and 150 nm.

3. The magnetic write head of claim 1, wherein the first thickness is between 10 nm and 40 nm.

4. The magnetic write head of claim 1, wherein a total maximum thickness of the first non-magnetic layer, the seed layer, and the second non-magnetic layer is between 40 nm and 300 nm.

5. The magnetic write head of claim 1, wherein the taper forms an angle between about 10 degrees and about 70 degrees to the ABS.

6. The magnetic write head of claim 1, wherein the taper comprises a first portion having a first taper angle and a second portion having a second taper angle, different from the first taper angle.

7. The magnetic write head of claim 6, wherein the first taper angle is between about 10 degrees and about 70 degrees to the ABS.

8. The magnetic write head of claim 7, wherein the second taper angle is between about 10 degrees and about 70 degrees to the ABS.

9. The magnetic write head of claim 1, wherein the first non-magnetic layer comprises $Al_2O_3$.

10. The magnetic write head of claim 9, wherein the seed layer comprises a material selected from the group consisting of ruthenium, rhodium, and iridium.

11. The magnetic write head of claim 10, wherein the second non-magnetic layer comprises a material selected from the group consisting of Ta, TaO, SiC, $Al_2O_3$, and combinations thereof.

12. A hard disk drive, comprising:
   a magnetic storage disk; and
   a magnetic write head for writing data to the disc drive, the magnetic write head comprising:
      an air bearing surface (ABS), adjacent to and facing the magnetic disk;

a magnetic write pole having an end substantially on the ABS;

a first non-magnetic layer disposed on the magnetic write pole and having an end at the ABS;

a seed layer disposed on the first non-magnetic layer, wherein the first non-magnetic layer and the seed layer have a first thickness;

a second non-magnetic layer disposed on the seed layer, wherein the second non-magnetic layer is recessed from the ABS and has a taper defined by an increasing thickness of the second non-magnetic layer from a second thickness at a first distance from the ABS, to a third thickness at a second distance from the ABS, where the third thickness is greater than the first thickness and the second distance is greater than the first distance; and a magnetic shield disposed on the seed layer and the second non-magnetic layer.

13. The hard disk drive of claim 12, wherein the first distance is between 20 nm and 150 nm.

14. The hard disk drive of claim 12, wherein the first thickness is between 10 nm and 40 nm.

15. The hard disk drive of claim 12, wherein a total maximum thickness of the first non-magnetic layer, the seed layer, and the second non-magnetic layer is between 40 nm and 300 nm.

16. The hard disk drive of claim 12, wherein the taper forms an angle between about 10 degrees and about 70 degrees to the ABS.

17. The hard disk drive of claim 12, wherein the taper comprises a first portion having a first taper angle and a second portion having a second taper angle, different from the first taper angle.

18. The hard disk drive of claim 17, wherein the first taper angle is between about 10 degrees and about 70 degrees to the ABS.

19. The hard disk drive of claim 18, wherein the second taper angle is between about 10 degrees and about 70 degrees to the ABS.

20. The hard disk drive of claim 12, wherein the first non-magnetic layer comprises $Al_2O_3$.

21. The hard disk drive of claim 20, wherein the seed layer comprises a material selected from the group consisting of ruthenium, rhodium, and iridium.

22. The hard disk drive of claim 21, wherein the second non-magnetic layer comprises a material selected from the group consisting of Ta, TaO, SiC, $Al_2O_3$, and combinations thereof.

* * * * *